Feb. 19, 1957 A. CHAIMOWICZ 2,781,972

READING DEVICE CONTROLLED BY MAGNETIC RECORD CARDS

Filed May 6, 1952 2 Sheets-Sheet 1

INVENTOR
ADAM CHAIMOWICZ
BY: Haseltine, Lake & Co.
AGENTS

United States Patent Office 2,781,972

Patented Feb. 19, 1957

2,781,972

READING DEVICE CONTROLLED BY MAGNETIC RECORD CARDS

Adam Chaimowicz, Paris, France, assignor to Compagnie des Machines Bull (Societe Anonyme), Paris, France Application May 6, 1952, Serial No. 286,407

Claims priority, application France May 17, 1951

4 Claims. (Cl. 235—61.11)

This invention has for its object record cards or tapes for accounting machines, statistical machines and the like, such cards or tapes, bearing on both their sides pre-impressions for value signs which are preferably arranged regularly in lines and columns, some of said value signs, located at a number of places corresponding to a data to be recorded, receiving marks in magnetic material.

Cards bearing records on both their sides or faces are already known; however, up to now, when recording marks on one face are to be read independently of those on the other face, the only means used has been based on the principle of recording marks being visible, or detectable by a photo-electric head, or by electrical conduction along a direction tangential to the card surface.

Magnetic cards are also known. However, usually the magnetizable material is contained within the thickness of the card, or is covered by a coating; it is very doubtful that with one of these known means, the utilization of two magnetic marks on a single support, with these marks situated on two parallel planes of close proximity, would have been possible. The difficulty resides in the likely impossibility of preventing the magnetic head intended for the sensing of one marking in one plane, from being influenced by both markings in the two planes.

However, recent progress in magnetic recording makes it possible to write on an accounting record card much in the same way as one would normally write on any document. I have deemed the application of this means of recording beneficial to the invention, since it allows the aforementioned markings to be separated by the full thickness of the card and since one card side may come quite close to the sensing head (and in fact does come into contact with it). Thus quite a different reaction is obtained at the reading head for each of the said markings.

The realization of such cards and tapes, bearing pre-impressions of index point values on their two sides and magnetic marks apposed on some of the index point locations thereof provides the possibility of making a new industrial product, the economical interest of which is evident.

This invention has for its further object a magnetic reading device designed and adapted for reading only magnetic marks on one side of a card or tape of the above-mentioned type, said device being constructed as will be explained further on.

This invention has for its further object a process for exploiting data in accounting machines controlled by record cards or tapes, this process consisting in the recording of data on both sides of a card or tape by means of magnetic marks and in the selective reading of the marks on the card side nearest to the magnetic reading device appropriately adapted.

Figure 1:
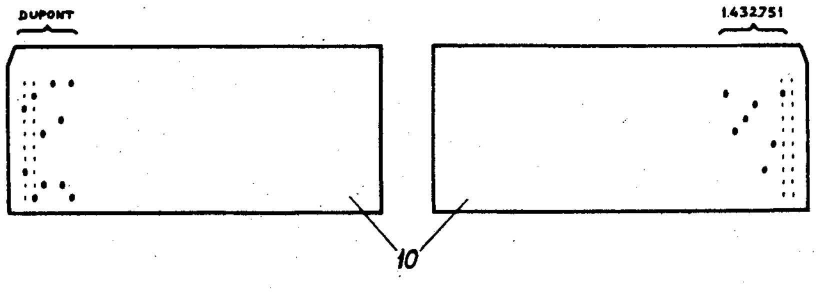
Figure 2:
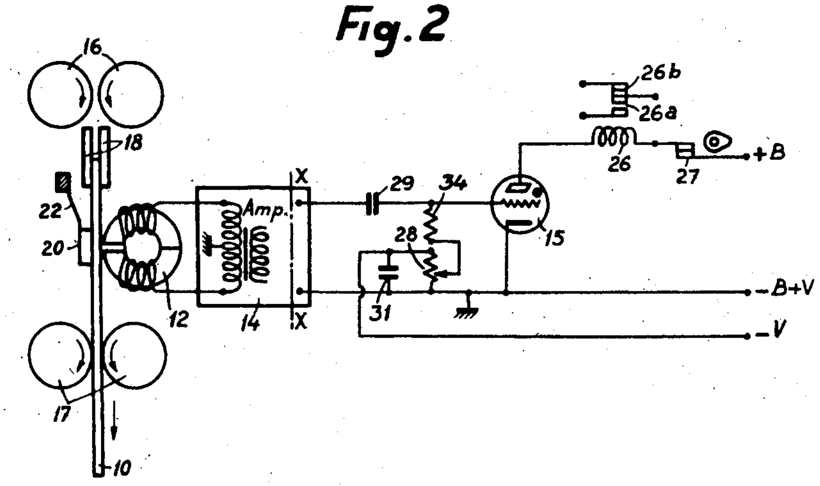
Figure 3:
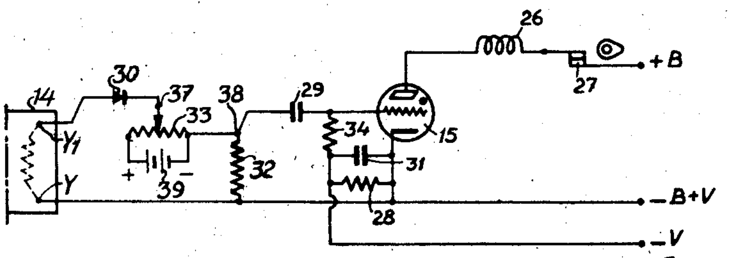
Figure 4:
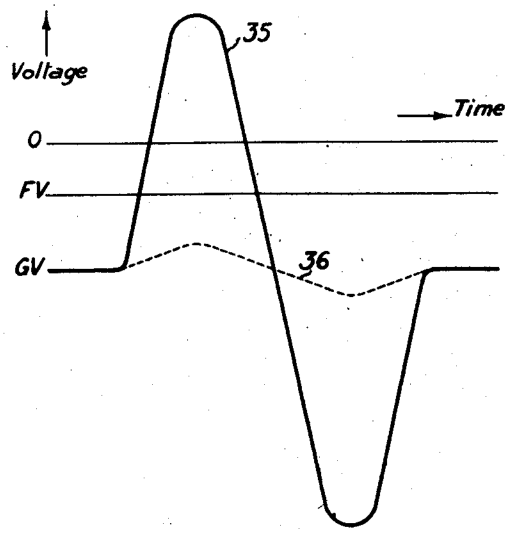

The present invention will be better understood by the following description, with reference to the appended drawings which show by way of illustration and without thereby limiting the scope of the invention:

Fig. 1, both sides of a record card;

Fig. 2, a schematic diagram of the arrangement, according to the invention, with a first form of realization of an electronic device with a lower operating limit;

Fig. 3, a second form of realization of said electronic device;

Fig. 4, a graph of a reading pulse.

In Figure 1 can be seen the two sides of an accounting record card 10; both these sides bear magnetic marks in zones which may be opposite to each other. For example, the zone bearing the name "Dupont," in the Bull alphabetical code, is opposite to the zone bearing the number 1,432,751. The cards may be similar to accounting cards of the usual model, except that they are pre-printed on both sides, these pre-impressions being used for localizing the index points. The values of the figures are recorded by means of marks, which may take any convenient form, whether it be dots, crosses, or actual ciphers. The cards may also be of a type especially adapted for receiving graphic signs without modifying the scope of the invention. The marks are apposed preferably manually by means of a pencil provided with a lead of magnetizable material or a pen dipped in a magnetizable ink, which are known per se, or by any other means for apposing magnetizable marks.

Obviously, before the first reading operation, the marks must be evenly magnetized by any suitable magnetizing means.

Fig. 2 shows diagrammatically the arrangement used, including card feeding means, a reading head 12, an amplifier 14, and signal utilization means. Card 10 is fed by means of rollers 16, a guide plate 18, and a small block 20 which is urged towards the reading head by a spring 22, so that the surface of the card will actually touch the reading head at passage. Thus the reading head intended for reading these marks and transforming them into electrical impulses being placed as close as possible to the card side to be read, the threshold of sensitivity of the head is normally such that it is responsive to the detection of magnetic particles which are supposed to be situated at a distance from the reading head inferior to the thickness of the card. As a result of this, the reading head is sensitive only to the recording magnetic particles, on the closer card side, and insensitive to those on the other side.

This result is very easy to bring about in practice. Supposing for example that the thickness of an accounting card is 0.16 mm., that the thickness of the magnetic material is 0.01 mm. and that the space between the reading head and the card side to be read is 0.01 mm., it follows that the distances from the reading head to the recording marks on either card side, when they pass before this head, will be 0.01 mm. and 0.17 mm. respectively. As a first approximation, it could be admitted that for usual reading heads and with the distance range adopted, the signal delivered by the reading head may vary in inverse ratio to the square of the distances. On the contrary, it has been found that, in reality, the collected signal corresponding to the closer card side is 10 to 20 times more intense than the one corresponding to the other side with the dimensions stated. Therefore, it is still easy to adjust the sensitivity of the reading head or alternatively to provide the amplification or utilization means with devices having a lower operating limit so as to cancel the signal corresponding to the remotest card side without impairing the signal corresponding to the side being read.

One alternative is shown in Fig. 2. One output terminal of amplifier 14 is connected through a capacitor 29 to the control grid of a gas filled triode 15, the other terminal being connected to ground and terminal —B. The grid potential of this triode can be adjusted at will by means of a potentiometer 28 shunted by a capacitor 31, so as to adjust the bias voltage of the triode. The plate circuit of the triode includes a relay winding 26, the contacts 26*a* and 26*b* of which are used in a manner known in accounting machines. The surge of voltage, corresponding to the mark passing before the reading head, and situated on the card side close to the same, drives the grid positive and fires the triode. By way of example, it is assumed that thyratron 15 is of the 2D21 type, the shield-grid of which, not shown in the drawing, is set at the same potential as the cathode; the high potential +B is +150 volts. Under these conditions, the tube may fire as soon as its control grid is driven over a voltage of —2 volts with respect to the cathode. Normally the adjustable tap of potentiometer 28 is set so that the grid bias is —5 volts with respect to the cathode. It may be admitted that, upon reading a mark, amplifier 14 delivers an alternating voltage pulse, as an illustrative example is shown by Fig. 4. If capacitor 29 and resistor 34 have proper values, said pulse is transmitted without change to the control grid of tube 15. On Fig. 4, the horizontal line marked 0 represents the ground potential or zero voltage taken as reference. The horizontal line marked FV corresponds to the firing voltage or —2 volts. The curve 35 indicates the voltage applied to the control grid of tube 15 upon reading of a mark on the side of the card touching the reading head. The amplitude of the wave is about 10 volts. During the positive alternance of the wave the control grid is driven positive well over the firing voltage FV, thus causing the firing of tube 15 and energization of relay 26. Relay 26 having been set into operation, a circuit breaker 27, controlled by a cam, momentarily cuts out the connection to terminal +B about the end of the machine cycle, in order to stop the firing of the triode, and make it sensitive to the sensing of the following signal.

When a magnetic mark on the side of the card opposite to the magnetic head passes in front of said head, the voltage pulse transmited to the control grid of the tube 15 is of lower amplitude. The resulting wave is represented on Fig. 4 by the curve 36 in dotted line. The amplitude of the wave is now about 1 volt. During the positive alternance, the grid potential remains below the firing potential FV, and the tube cannot fire. Thus the marks on said side of the card are not operative to actuate the reading system.

According to another embodiment of the invention, it is also possible to realize a device with a lower operating limit as diagrammatically shown in Fig. 3.

A complete circuit is formed by the rectifier cell 30, a part of potentiometer 33 connected across battery 39 and resistor 32, all connected in series across output terminals Y1, Y of the amplifier 14. The adjustable tap of potentiometer 33 is set so that point 37 is positive by, say, 3 volts with respect to point 38. The value of resistor 32 may be, for instance, 0.1 MΩ, that is a much greater value than that of potentiometer 33 or than that existing between terminals Y1, Y in the amplifier 14. Due to the particular disposition of rectifier cell 30, its resistance in backward direction is very high, and in normal condition, point 38 is substantially at the same potential as point Y.

The positive alternance of a wave such as represented by line 36 on Fig. 4, when appearing across output terminals Y1, Y is not sufficient to overcome the opposed voltage between points 37 and 38. The resistance of rectifier cell 30 remains very high and no pulse is transmitted through capacitor 29 to the control grid of tube 15. However, when the amplitude of the positive alternance of a pulse appearing at terminals Y1, Y, overcomes said opposed voltage, the resistance of rectifier cell 30 in forward direction becomes very low. If said amplitude is 10 volts, as before said, a positive pulse of about 7 volts appears across resistor 32 and is transmitted to the control grid of tube 15, which fires.

In this case the potential —V may have a value a little below the firing potential, say —3 volts.

As in the preceding embodiment the magnetic marks are discriminated when read according to the side of the card where they are located.

I claim:

1. In combination, a magnetic sensing head, a card feeding device for feeding record cards past said sensing head, said cards bearing magnetic marks on their two sides, an amplifier connected across the sensing head for amplifying the current impulses generated by the passage of magnetic marks in front of the sensing head, said amplifier incorporating voltage discriminating means with a lower limit of operating voltage this voltage limit being adjusted to a value inferior to the value of the voltage derived from the passage of marks situated on the card side which is the closest, with respect to the sensing head, and superior to the one corresponding to the passage of marks situated on the card side which is remote with respect to the sensing head, and means connected to said amplifier and made operative for controlling the working of execution means.

2. In combination, a magnetic sensing head, a card feeding device for feeding record cards past said sensing head, said cards bearing magnetic marks on their two sides, an amplifier connected to the sensing head outlet for amplifying the current impulses generated by the passage of magnetic marks before the sensing head, said amplifier incorporating voltage discriminating means with a lower limit of operating voltage comprising manually settable resistor means for adjusting said voltage limit to a value inferior to the value of the voltage derived from the passage of marks situated on the card side which is the closest, with respect to the sensing head, and superior to the one corresponding to the passage of marks situated on the card side which is remote with respect to the sensing head, and means comprising electromagnetical relays for controlling the working of execution control means and connected to the outlet of said amplifier.

3. In a magnetic record card reading device, a magnetic sensing head, a card feeding device for feeding record cards past said sensing head, said cards bearing magnetic marks on their two sides, an amplifier connected to the sensing head outlet for amplifying the current impulses generated by the passage of magnetic marks before the head, a gas filled electron tube having its control grid brought to a determined bias potential by voltage discriminating elements and connected to an outlet of the amplifier so as to be fired by a voltage delivered by the amplifier corresponding to the passage of a magnetic mark situated on the card side which is the closest with respect to the sensing head, whereas the passage of marks situated on the other card side corresponds in the same conditions to voltages inferior to the firing voltage of the gas filled tube, means comprising electromagnetical relays for controlling the working of execution means and connected to the plate circuit of said tube.

4. In a magnetic record tape reading device, a magnetic sensing head, a tape feeding device for feeding said tape past said sensing head, said tape bearing magnetic marks on its two sides, an amplifier connected to the sensing head outlet for amplifying the current impulses generated by the passage of magnetic marks before the sensing head, said amplifier incorporating voltage discriminating means with a lower limit of operating voltage, this voltage limit being adjusted to a value inferior to the value of the voltage derived from the passage of marks situated on the tape side which is the closest, with respect to the sensing head, and superior to the one corresponding to the passage of marks situated on the tape side which is remote with respect to the sensing head, and means connected to said amplifier and made operative for controlling the working of execution control means.

References Cited in the file of this patent

UNITED STATES PATENTS

| | | |
|---|---|---|
| 2,084,848 | Lasker | June 22, 1937 |
| 2,254,933 | Bryce | Sept. 2, 1941 |
| 2,496,047 | Goddard | Jan. 31, 1950 |
| 2,501,126 | Howell | Mar. 21, 1950 |
| 2,508,953 | Knutsen | May 23, 1950 |
| 2,584,714 | Kirkpatrick | Feb. 5, 1952 |
| 2,643,130 | Kornei | June 23, 1953 |